(12) United States Patent
Fransen

(10) Patent No.: US 10,244,057 B2
(45) Date of Patent: Mar. 26, 2019

(54) TECHNIQUES FOR ASSOCIATING AND SHARING DATA FROM MULTIPLE LOCAL DEVICES

(71) Applicant: Adobe Systems Incorporated, San Jose, CA (US)

(72) Inventor: Peter Fransen, Soquel, CA (US)

(73) Assignee: Adobe Systems Incorporated, San Jose, CA (US)

(*) Notice: Subject to any disclaimer, the term of this patent is extended or adjusted under 35 U.S.C. 154(b) by 509 days.

(21) Appl. No.: 14/879,234

(22) Filed: Oct. 9, 2015

(65) Prior Publication Data

US 2017/0104831 A1 Apr. 13, 2017

(51) Int. Cl.
| | |
|---|---|
| *H04L 29/08* | (2006.01) |
| *H04L 12/26* | (2006.01) |
| *H04W 4/02* | (2018.01) |
| *H04W 8/00* | (2009.01) |
| *H04W 8/18* | (2009.01) |

(52) U.S. Cl.
CPC ......... *H04L 67/148* (2013.01); *H04L 43/065* (2013.01); *H04L 43/16* (2013.01); *H04L 67/18* (2013.01); *H04L 67/22* (2013.01); *H04L 67/306* (2013.01); *H04W 4/02* (2013.01); *H04W 8/005* (2013.01); *H04W 8/18* (2013.01)

(58) Field of Classification Search
CPC .............................. H04L 67/22; H04L 67/306
See application file for complete search history.

(56) References Cited

U.S. PATENT DOCUMENTS

| | | | | |
|---|---|---|---|---|
| 8,898,074 B2* | 11/2014 | Doughty | ............ | G06Q 30/0269 705/14.49 |
| 9,549,225 B2* | 1/2017 | Feng | .................. | H04N 21/4788 |
| 2007/0239405 A1* | 10/2007 | Behrens | ................ | G06Q 10/10 703/2 |
| 2010/0287031 A1* | 11/2010 | Mckenna | ............... | G06Q 10/06 705/7.29 |
| 2011/0014928 A1* | 1/2011 | Ruckart | ................ | G06Q 30/02 455/456.3 |
| 2014/0075464 A1* | 3/2014 | McCrea | ............. | G06F 19/3418 725/14 |
| 2014/0244744 A1* | 8/2014 | Lyren | ..................... | G06Q 50/01 709/204 |

(Continued)

*Primary Examiner* — Lashonda T Jacobs
(74) *Attorney, Agent, or Firm* — Kilpatrick Townsend & Stockton LLP

(57) ABSTRACT

Systems and methods for accurately and efficiently associating devices with a user profile and compiling use information from such devices are disclosed. Devices are associated with the same user profile based on identifying consistent proximity of the devices to one another, e.g., by identifying that the devices are frequently used in proximate locations during a time period or by identifying that the devices are paired with one another. Local devices, rather than a remote server, are used to more efficiently associate devices with the user profile and/or compile use information from such devices. Devices that are associated with the same user profile as a local collection device send use information to the local collection device. The information from all of the devices associated with the user profile is then shared locally with other devices associated with that user profile and sent to a remote collection server.

19 Claims, 5 Drawing Sheets

(56) References Cited

U.S. PATENT DOCUMENTS

| | | | |
|---|---|---|---|
| 2015/0019342 A1* | 1/2015 | Gupta | G06Q 30/0269 |
| | | | 705/14.66 |
| 2015/0327060 A1* | 11/2015 | Gilson | H04W 76/10 |
| | | | 726/7 |
| 2016/0182658 A1* | 6/2016 | Allinson | H04L 67/1097 |
| | | | 709/224 |
| 2016/0277795 A1* | 9/2016 | Robbins | H04N 7/163 |
| 2017/0124102 A1* | 5/2017 | Ching | G06F 17/30241 |
| 2017/0279653 A1* | 9/2017 | Gilson | H04W 76/10 |
| 2018/0007154 A1* | 1/2018 | Casey | H04L 41/5035 |

* cited by examiner

TECHNIQUES FOR ASSOCIATING AND SHARING DATA FROM MULTIPLE LOCAL DEVICES

FIELD OF THE INVENTION

This disclosure relates generally to computer-implemented methods and systems and more particularly relates to improving the efficiency and effectiveness of computing systems used in identifying multiple devices to associate with a particular user profile and compiling use information from such devices.

BACKGROUND OF INVENTION

The number and types of devices that collect data about individuals and households continues to grow. Many users now have desktop computers, laptops, tablets, gaming devices, cell phones, and/or home appliances such as refrigerators, thermostats, and toasters, that are configured with monitoring and information tracking capabilities. The increase in the number and types of such devices is making a massive amount of disparate (e.g., device specific) data points available.

Given such a massive amount of data, it is desirable to determine a set of devices that are associated with a particular user profile for an individual or household so that, when actions on those devices are tracked, the actions can be associated with a particular user profile and collectively used, for example, to identify and provide targeted marketing and content to the devices associated with the user profile. However, identifying a set of devices associated with a particular user profile is often difficult because individuals and households commonly have multiple devices, share devices with other users, borrow devices from one another, and use public-access devices. Existing techniques that group devices by making probabilistic determinations based on common device IP addresses generally lack accuracy. In addition, such probabilistic matching and other grouping techniques are applied on remote server devices that must attempt to process the massive and ever growing amount of data. Such techniques are highly complex, non-deterministic with any amount of consistency, and require significant, and possibly prohibitive, amounts of data storage and processing capabilities.

SUMMARY

Systems and methods for accurately and efficiently associating devices with a user profile and compiling use information from such devices are disclosed. Devices are associated with the same user profile based on identifying consistent proximity of the devices to one another, e.g., by identifying that the devices are frequently used in proximate locations during a time period, or by identifying that the devices are paired with one another. Rather than relying exclusively on remote devices, local devices are used to more efficiently associate devices with the user profile and/or compile use information from such devices. Devices that are associated with the same user profile send use information to a local collection device. The information from all of the devices associated with the user profile is then shared locally with other devices associated with that user profile and sent to a remote collection server.

One embodiment involves receiving information about use of a first device and a second device and comparing the information with association criteria. The association criteria requires identifying use of the first device and the second device in proximate locations during a time period or pairing of the first device to the second device. Based on determining that the information about use of the first device and the second device satisfies the association criteria, the first device and the second device are associated with the particular user profile.

Another embodiment distributes or sends use information from devices associated with a particular user profile using a local collection device. This embodiment involves associating a plurality of local devices with the particular user profile and assigning a first device of the plurality of devices to be a local collection device. Based on assigning the first device to be the local collection device, use information from other devices associated with the particular user profile is aggregated at the local collection device. The aggregated use information is then distributed to other local devices associated with the particular user profile and/or sent to a remote collection server.

These illustrative embodiments and features are mentioned not to limit or define the disclosure, but to provide examples to aid understanding thereof. Additional embodiments are discussed in the Detailed Description, and further description is provided there.

DETAILED DESCRIPTION

Figure 1:
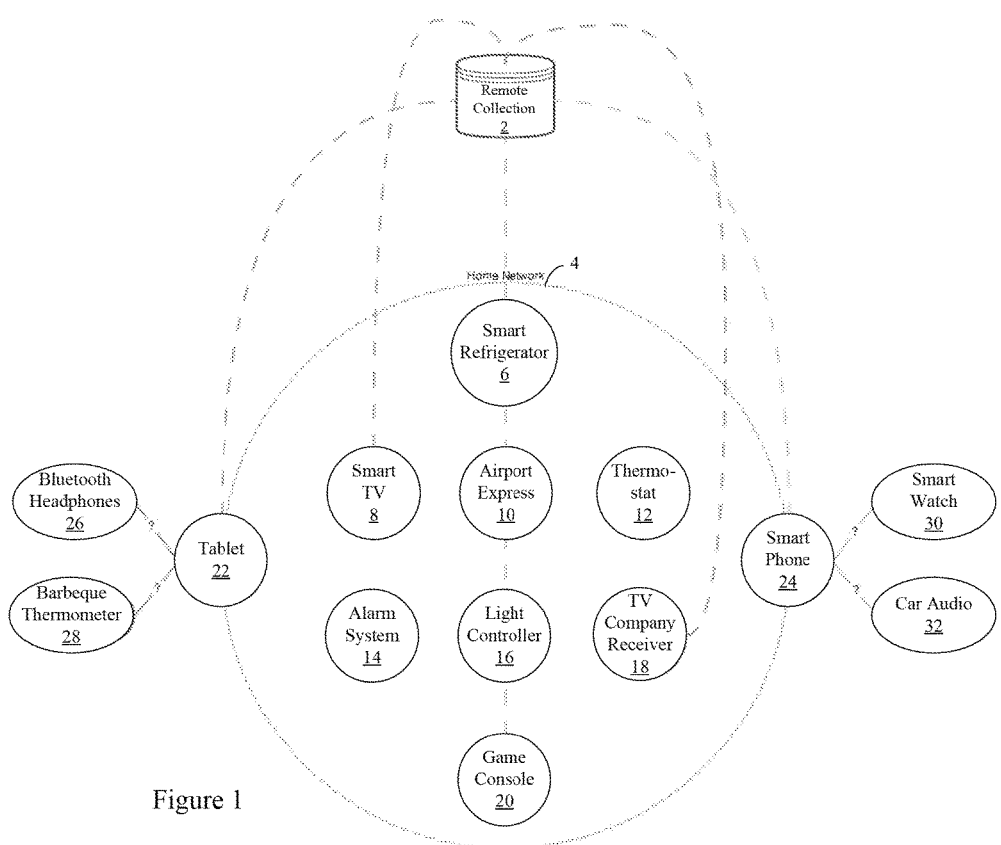
FIG. 1 is a block diagram depicting an example of a system for remote association and collection of device use information.

As described above, it is desirable to identify multiple devices that are associated with an individual or household so that tracked interactions on multiple devices can be combined to provide a more complete picture of the individual's or household's activities and interests. For example, it is desirable to identify that a smart phone, laptop, tablet, refrigerator, barbeque thermometer, watch, and car audio system are all used by a particular individual or household, form a user profile based on the tracked interactions and other uses on those devices, and send targeted advertisements to the devices based on the user profile. Existing techniques for associating multiple devices, however, often fail to accurately and efficiently identify devices that are really associated with a particular individual or household. Embodiments of the invention more accurately and efficiently associate devices with a particular user profile. In one embodiment, devices are associated with a particular user profile based on identifying consistent proximity of the devices to one another, e.g., by comparing locations and times that the devices are used to identify that the devices that are frequently used at proximate times in proximate locations as one another. In another embodiment, devices are additionally or alternatively associated with a particular user profile based on identifying the devices having been paired with one another. Another embodiment associates devices with a particular user profile additionally or alternatively based on user input identifying an association between the devices.

Certain embodiments use one or more local devices to provide more efficient techniques for associating devices with a user profile and/or compiling use information from such devices. The association of local devices in one embodiment is performed by a local device, thus reducing or eliminating the need to associate devices using a remote server. Similarly, a local device can be used to collect use information. Existing techniques used to identify associated devices and to collect use information generally require significant amounts of data transmission and processing on the remote servers that implement these functions. Each local device sends its own messages with collected data to the remote servers that must process such information to determine which devices are to be associated with a given user profile. Embodiments of the invention, in contrast, reduce the amount of data transmission by assigning one or more devices associated with a user profile to be local collection devices that make user profile association determinations and/or aggregate use information. The local devices determine that they are associated with one another based on local information (i.e., direct communications on local networks, using local communication means, etc.) Other devices that are determined to be associated with the same user profile are instructed to send use information to the local collection devices. The information from all of the devices associated with the particular user profile is then shared locally with other devices associated with the user profile and/or sent to a remote collection server using messages that aggregate information from the multiple devices.

Unlike prior techniques there is a reduced need for the remote server to associate devices with a particular user profile since many or all of such determinations can be made by the local devices. Accordingly, embodiments reduce or eliminate the computing requirement barriers and network efficiency problems of prior techniques. Additionally, embodiments facilitate sharing of information on local devices associated with a particular user profile without necessarily involving a remote collection server to facilitate the sharing, further reducing computing and network requirements.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

As used herein, the term "device" refers to an apparatus that includes electronics, software, sensors, or network connectivity, which enables the apparatus to receive information, use information, display information, collect information, control another apparatus, sense an environmental condition, or perform any other electronic device function. Examples of devices include, but are not limited to, a desktop computer, a laptop, a tablet, a cell phone, a television, a video camera, a camera, a wearable device such as a watch, a barbeque thermometer, a lamp, an in-ceiling light, a light switch, a navigation apparatus, a car audio system, in-home appliances, refrigerators, microwaves, ovens, toasters, blenders, dishwashers, thermostats, alarm clocks, fitness equipment, heaters, air-conditioners, humidifiers, security systems, floor sensors, movement sensors, surveillance apparatus, and electronic door and window lock mechanisms. A particular user may own or use one device or many devices. Each device may be used to perform particular functions, or the devices may have overlapping functions.

As used herein the term "user profile" refers to information that is collected about a particular individual or household. A user profile is used to compile information about use of devices by an individual or household, such as use of a device to access a webpage, click on a link, send a communication, control the temperature of the house, cook a particular food, etc.

As used herein the term "local" refers to devices being located proximate one another such that the devices can communicate with one another via direct communication, e.g., Bluetooth, personal area network, local area network, etc., without having to access the Internet or other public network. Local devices will typically be located in the same house, building, or property.

As used herein the term "remote" refers to a device not being local with respect to other devices. For example, if use information is being sent from a home computer device located at an individual's home through the Internet to a collection server that is located away from the individual's home, the collection server is remote from the home computer. As another example, if an individual's cell phone sends use information from the cell phone through a public telephone network to a collection device, the collection device is remote from the cell phone. As another example, if a utility meter reading device sends utility use information through a mesh network operated to collect information from multiple households at a collection device, the collection device is remote from the utility meter reading device.

As used herein the term "proximate locations" refers to devices being geographically or communicatively close to one another according to one or more proximate location criteria. An example proximate location criteria requires that devices be "local" to one another to be considered at proximate locations. Another proximate location criteria requires that the devices be within a threshold geographic distance of one another to be considered at proximate locations. Another proximate location criteria requires that devices be located within a same boundary area associated with a single address or geographic location to be considered at proximate locations.

As used herein the term "pairing" refers to devices being linked together in a way that allows direct communication between the devices. Bluetooth, for example, uses a pairing process to link devices.

As used herein the term "aggregate" refers to compiling use information from multiple devices. The individual data items from the different devices can remain separate in the compiled collection or can be added, summarized, or otherwise combined to provide a condensed data collection.

Referring now to the drawings, FIG. 1 is a block diagram depicting an example of a system for remote association and collection of device use information. This example involves a home network 4 that is accessed by a smart refrigerator 6, a smart TV 8, an Airport Express 10, a thermostat 12, an alarm system 14, a light controller 16, a TV Company receiver 18, a game console 20, a tablet 22, and a smart phone 24. The tablet 22 is linked to Bluetooth headphones 26 and a barbeque thermometer 28. The smart phone 24 is linked to a smart watch 30 and a car audio system 32. A remote collection device 2 receives use information from some of these devices and attempts to identify whether the devices are associated with a common user profile (i.e., for an individual or household). Moreover, the remote collection device 2 does not receive information from some of the devices at all.

Figure 2:
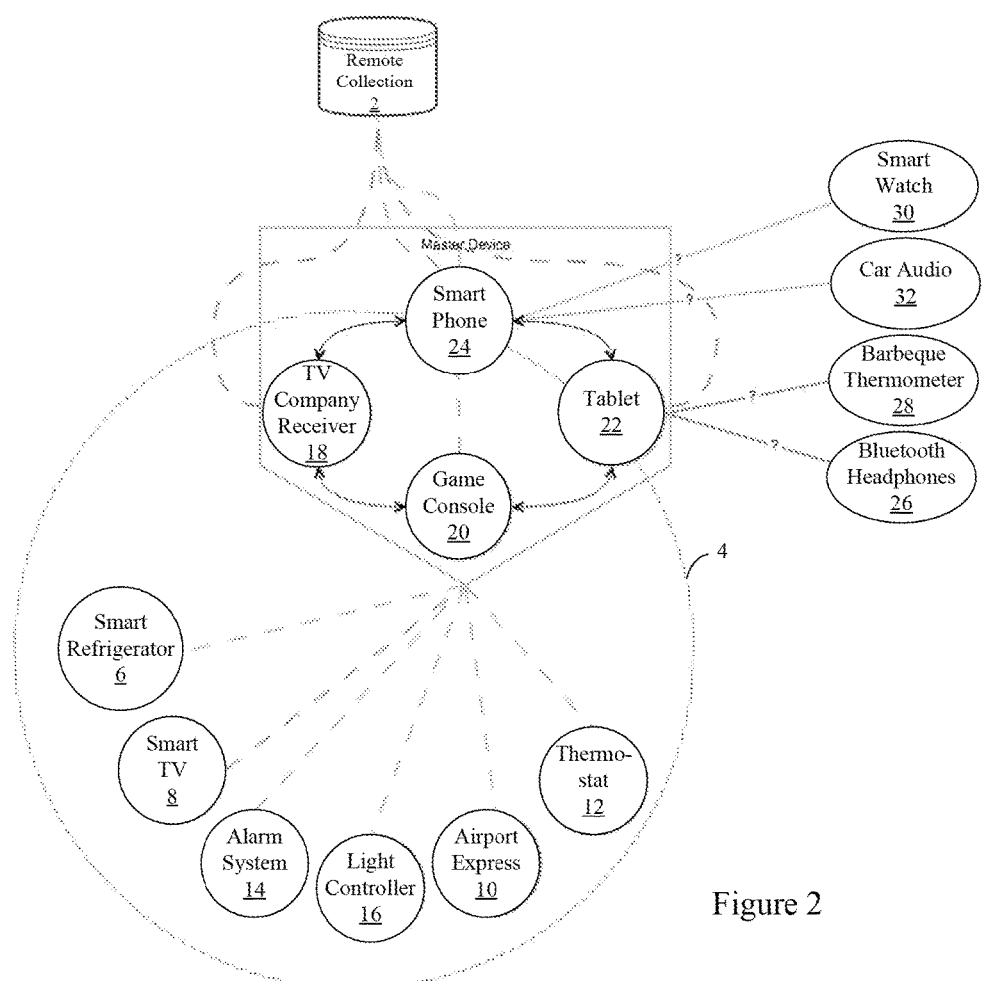
FIG. 2 is a block diagram depicting an example of a system for local association and compiling of device use information.

In contrast, FIG. 2 is a block diagram depicting an example of a system for local association and compiling of device use information. In this example, four devices: TV Company receiver 18, game console 20, tablet 22, smart phone 24 are selected as local collection devices to collect use data from the other devices. Moreover, these devices are identified as all being associated with a single user profile based on the proximity of the devices, in this example, the association is identified based on each of the devices having been used on the home network 4 with other ones of the devices during the same time periods on more than 5 occasions. A visitor's phone that connected to the home network 4 without satisfying this criteria is not associated with that user profile.

In FIG. 2, the local collection devices: the TV Company receiver 18, game console 20, tablet 22, smart phone 24 collect use information from the other devices. For example, the smart phone 24 may have an application running that receives information from the smart refrigerator, the alarm system 14, the light controller 16, and the thermostat 12, compiles this information into a message, and provides that use reporting message to the remote collection device 2, for example, via the Internet. In this example, the smart phone 24 also shares use information amongst the device. As a specific example, the smart phone 24 may send information about use of the thermostat to the smart TV, which can display a warning message that the refrigerator door is open and/or provide advertising (e.g., regarding replacement water filters based on the refrigerator water filter getting low).

In FIG. 2, smart watch 30 and car audio 32 are identified as associated with the same user profile as smart phone 24 based on these devices having been paired with smart phone 24. Similarly, barbeque thermometer 28 and Bluetooth headphones 26 are also associated with the same user profile based on the direct connections with tablet 22. Information is similarly shared to and from these devices even though they are not connected to the home network 4. In one example, information from the barbeque thermometer (e.g., identifying that it was recently set to a "steak" setting and used in that setting) is sent to the smart phone 24, which displays an appropriate advertisement.

In one example, the information identifies a pattern (e.g., the thermometer has been used for steak four Sundays in a row) and the smart phone 24, based on this detected pattern, selects and displays a "steak" advertisement on a Saturday or early in the day on a Sunday to the user. In another example, information about smart watch 30 executing a golf course distance application every Saturday morning for five weeks in a row is tracked and provided to TV Company receiver 18, that uses this information to provide golf-targeted advertising on television devices in the household.

In the above example, association of multiple devices with a user profile and selection of advertisements and other content is provided using local devices and without requiring communication to a server. This reduces the network and server requirements of the system. In addition, user profile data, in one embodiment, is maintained locally without providing it to the remote collection server. In this example, a user selects a privacy setting the prevents some or all of the household's device use data from being sent outside of the local devices. In one example, a restriction specifies that the household thermostat setting will not be sent to the remote collection device 2.

In the embodiment of FIG. 2, the local collection devices, i.e., the TV Company receiver 18, game console 20, tablet 22, and smart phone 24, are selected to be local collection devices based on the devices having the best capabilities to understand and report information. In another embodiment, the devices that will act as local collection devices are selected based on other criteria and/or are manually selected. Such criteria can relate to the device's local storage, internet connectivity, other connectivity options, how many other devices can attach to the device, etc. However selected, the local collection devices act as clearinghouses or collection points that are local to the household and collect use data from all of the devices of the household. The local collection devices also synchronize that data amongst the devices to ensure that the devices each always have a valid picture of the user profile. The local collection devices are aware of one another and send data back to remote collection device 2 to provide a complete picture of the household.

In contrast, devices tracked by existing analytics systems are not synchronized with each other. Their profiles are often separately kept and data is synced after collection at the server based on probabilistic guessing. The techniques disclosed herein provide advantages over this by having local collection devices that receive data from multiple devices and collect it and associate it with a single user profile. Because use information from multiple devices is collected at a local collection device, the recipient knows that all of those local devices associated with the collection device should be associated with a single user profile. For example, two devices that are consistently attached to a home WIFI network during common time periods can be determined to be associated with the same user profile. Based on this locally-made determination, one of the devices can provide use information about use of both devices to a remote server. The remote server does not have to independently determine that the use data of the two devices should be associated with the same user profile.

Local collection devices can operate in various ways. In one embodiment, a local collection device acts as a proxy. In this case, the local collection device intercepts communications sent from the other local devices to a remote server. In another embodiment, local devices are configured to search for local collection devices and prefer a collection point over a remote server whenever a local collection device is available. If multiple local collection devices are available, the local devices in this example are configured to select the collection device that is the most current, has the best communication capabilities, has the most storage, or is based on any other suitable criteria. If a device cannot find a local collection device, for example because the device is not at the home location, then the device may determine to use a remote collection device and/or save use data until the device returns to the home location where the device can access a local collection device.

Sharing information between local collection devices is valuable in various circumstances. For example, if smart phone 24 is away from the home location (and therefore away from the other devices), information about the use of the other devices can still be used if that information was previously shared with the smart phone 24 while at the home location. In a specific example, if the barbeque thermometer 28 collects information and sends it to tablet 22 and tablet 22 shares it with smart phone 24, then smart phone 24 can present appropriate targeted advertising about steak that is on sale while in the grocery store going past the steak section the following day. Ultimately the use information from the various local devices could be collected by a remote data system, but there are advantages to having local device information shared amongst the devices themselves. Generally, based on the shared information, the local devices can use the information to make determinations without contacting the remote server, thus eliminating the need to have remote systems make such determinations.

Privacy is also protected in certain embodiments. For example, advertising and other enhanced content can be provided based on local determinations so that use providing information to a remote server is not necessary. In another example, encryption techniques are used to ensure that only appropriate recipient local devices receive certain data from other local devices. For example, a barbeque thermometer that was configured to send information out on the Internet back to the manufacturer of the thermometer may be configured to ensure that the thermometer cannot also send information about what is being watched on the TV to that manufacturer. The barbeque manufacturer uses its public and private encryption keys and encrypts data as it puts the data in the shared pull so that the local collection devices can decrypt it, however, the local devices may be unable to decrypt encrypted sensitive data from other devices.

Criteria-based determinations are also used to identify devices in alternative environments, such as dual homes, vacation homes, work places, relative households, etc., that are associated with a user profile. In one example, a threshold is used to identify alternative environments. A user profile may classify devices based on type, e.g., personal devices, shared devices, work place devices, etc., and such classifications may be based on determinations made based on how (when, where, etc.) the devices of the user profile interact with each other. In one embodiment, devices are associated with a user profile based on frequency of interactions of related devices, e.g., a smart watch interacting with a soda vending machine consistently but only on weekday mornings can be the basis for identifying that the soda vending machine should be associated with the user profile as a work place type device.

Associations of devices with a user profile are determined at particular points in time and learned so that the associations are known at later points in time even when the devices are not local to one another anymore. This allows disconnected devices to save their own use information while disconnected and then provide that information to a local collection point device at a next available time.

The following chart illustrates different types of devices.

Existing systems at most track devices in the first three categories and often fail to accurately associate devices with these first three categories with a user profile. In many cases, each of the devices is considered to be operated by a separate user. Embodiments presented herein allow smart devices to maintain context between themselves. All data collection funnels through one or a few of these devices that are responsible for aggregating this information out to a remote collection server. A consensus model is used in certain embodiments to determine a most-correct local collection device. The consensus, in one embodiment, is gained by a simple method by selecting a device with the most recent interaction with an individual. In another embodiment, consensus is gained by a more complex shared consensus model such as a Satoshi Blockchain or similar concept.

Figure 3:
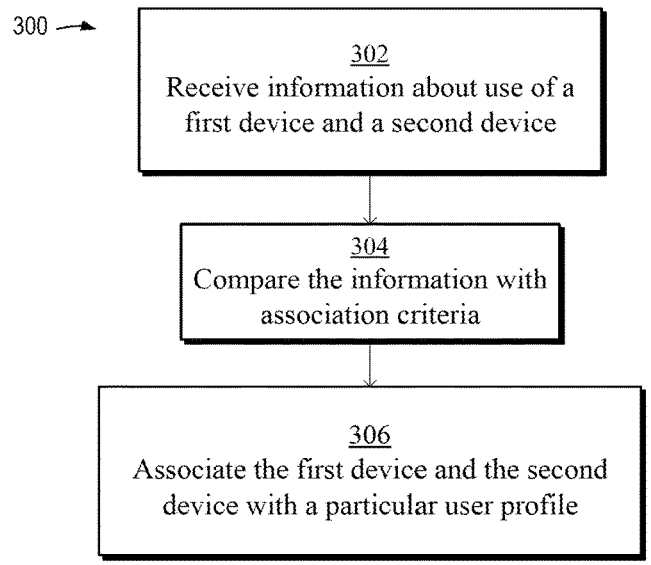
FIG. 3 is a flowchart illustrating an exemplary method for associating devices with a user profile.

FIG. 3 is a flowchart illustrating an exemplary method 300 for associating devices with a user profile. Method 300 is performed in a computing environment in which use information is tracked for devices and is specifically performed by a device, such as computing device 700 of FIG. 7, comprising a processor executing stored instructions.

Method 300 involves receiving information about use of a first device and a second device, as shown in block 302. The information about use of the first device and second device, in one example, is information identifying when the devices have both connected to a same local area network in one or more time periods. In another example, the information identifies that the devices have been paired to one another. In another example, the information relates to specific uses on each of the devices, e.g., to access a particular webpage, make an online purchase, control a temperature setting for an air condition unit, etc.

The method 300 further involves comparing the information about use of the first device and the second device with association criteria, as shown in block 304, and associating the first device and the second device with a particular user profile based on that comparison, as shown in block 306. Specifically, based on determining that the information about use of the first device and the second device satisfies the association criteria, the first device and the second device are associated with the particular user profile. In one embodiment, a local device (e.g., the first device, second device, or some other device that is local to the first and second device) determines that the information about the first device and second device satisfies the association criteria. The local device that determines to associate the first and second devices with the user profile is also used to collect information locally with respect to use of first and second devices, i.e., as a local collection device, for use in providing targeting advertising and other purposes. In another embodiment, the local device that determines to associate the first and second devices with the user profile is not used to collect use information for other purposes.

TABLE 1

| Device Class | Internet Connectivity | Other Connectivity (e.g. Bluetooth) | On-Device Storage | Transient | Example Devices |
|---|---|---|---|---|---|
| Perm/Network Connected | Yes | No | Yes | No | Set-top box, network router, gaming system |
| Transient/Bridge | Yes | Yes | Yes | Maybe | Smartphone, Tablet, some laptops |
| Smart | Yes | Maybe | No | No | Smart TVs |
| Stupid | Maybe | Yes | No | No | Home automation, lighting controllers, car networks |
| Wearables | No | Yes | No | Maybe | Smart Watches, Bluetooth Headsets, health monitors |

The association of the first device and second device with the user profile is determined locally in one embodiment and remotely in another embodiment. If determined locally, the association is used to update a locally stored user profile and/or to update a remotely stored user profile. The local and/or remotely stored user profiles are used to provide targeted advertisements and otherwise used to provide services to the individual or household associated with the user profile. The user profile, in one embodiment, identifies all devices that are associated with the user profile. In one embodiment, such devices are assigned a confidence value identifying how confident the system is that a given device is really associated with a profile. In another embodiment, devices associated with a user profile are given a type, e.g., personal device, work device, vacation home device, or any other appropriate type.

Figure 4:
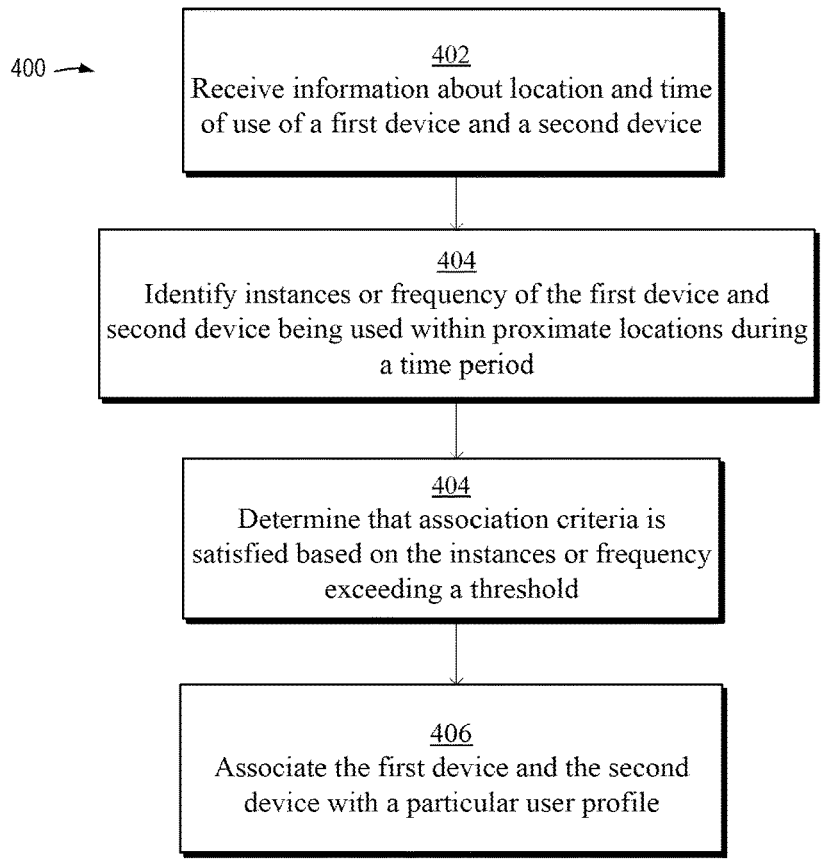
FIG. 4 is a flowchart illustrating an exemplary method for associating devices with a user profile based on instances or frequency of the devices being used within proximate locations during a time period.

FIG. 4 is a flowchart illustrating an exemplary method 400 for associating devices with a user profile based on instances or frequency of the devices being used within proximate locations during a time period. Method 400 is performed in a computing environment in which use information is tracked for devices and is specifically performed by a device, such as computing device 700 of FIG. 7, comprising a processor executing stored instructions. Method 400 involves receiving information about use of a first device and a second device, as shown in block 402. This block provides functionality similar to functionality of block 302 of FIG. 3.

Method 400 further involves identifying instances or frequency of the first device and second device being used within proximate locations during a time period, as shown in block 404. For example, this may involve examining 15 minute time windows throughout the course of a day, week, or a month and identifying that the first devices and second devices were both used in the same time windows on 20 occasions at proximate locations to one another. As another example, this may involve examining one hour time windows throughout the course of a day, week, or month and identifying that the first device and second device were used together at proximate locations in 10% of the time windows. Numerous other measures of instances or frequency are contemplated and will be apparent to those of skill in the art in light of the teachings herein.

Method 400 further involves determining that association criteria is satisfied based on the instances or frequency exceeding a threshold, as shown in block 406. In the 15 minute time window example above, this involves determining that the first and second devices where both used in the same time window at proximate locations to one another at least 10 times. In the one hour time window example above, this involves determining that the first device and second device were used together in at least 5% of the time windows at proximate locations to one another. In other embodiments different time windows and thresholds are used. In other embodiments, only one time period is used, e.g., such that the method determines that, over the course of a weeklong single time period, the devices were used in proximate locations at least 25 times, etc. In other embodiments, the other association criteria are used.

Method 400 further involves, based on determining that the information about use of the first device and the second device satisfies the association criteria, associating the first device and the second device with the particular user profile, as shown in block 408. This block provides functionality similar to functionality of block 306 of FIG. 3.

Figure 5:
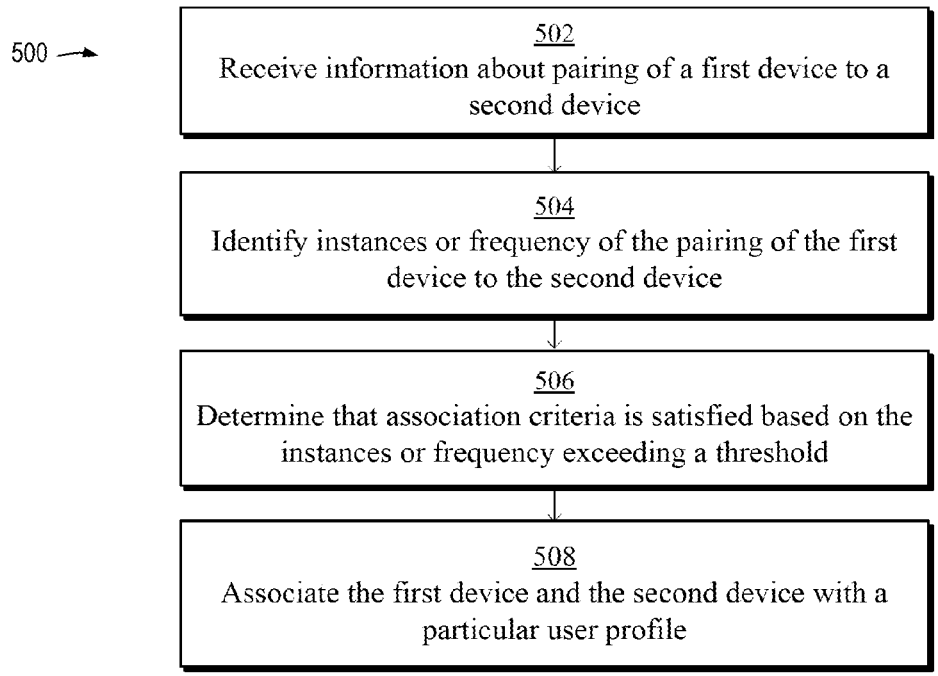
FIG. 5 is a flowchart illustrating an exemplary method for associating devices with a user profile based on instances or frequency of the devices being paired with one another.

FIG. 5 is a flowchart illustrating an exemplary method 500 for associating devices with a user profile based on instances or frequency of the devices being paired with one another. Method 500 is performed in a computing environment in which use information is tracked for devices and is specifically performed by a device, such as computing device 700 of FIG. 7, comprising a processor executing stored instructions. Method 500 involves receiving information about use of a first device and a second device, as shown in block 502. This block provides functionality similar to functionality of block 302 of FIG. 3.

Method 500 further involves identifying instances or frequency of pairing of the first device to the second device, as shown in block 504. In one example, this involves identifying that the first devices have been paired together 20 times. In one example, this involves determining that one of the first device and second device has not been paired with any other device. In another example, this involves identifying that the first device and second device have been paired with one another at least 1 time on 50% of the days during the last month. Numerous other measures of instances or frequency are contemplated and will be apparent to those of skill in the art in light of the teachings herein.

Method 500 next involves determining that association criteria is satisfied based on the instances or frequency exceeding a threshold, as shown in block 506. In one embodiment, this involves determining that the devices have been paired with one another on at least a threshold number of instances. In another embodiment, this involves determining that the devices have been paired with each other on at least a particular percentage of days. In other embodiments, the other association criteria are used.

Method 500 further involves, based on determining that the information about use of the first device and the second device satisfies the association criteria, associating the first device and the second device with the particular user profile, as shown in block 508. This block provides functionality similar to functionality of block 306 of FIG. 3.

Figure 6:
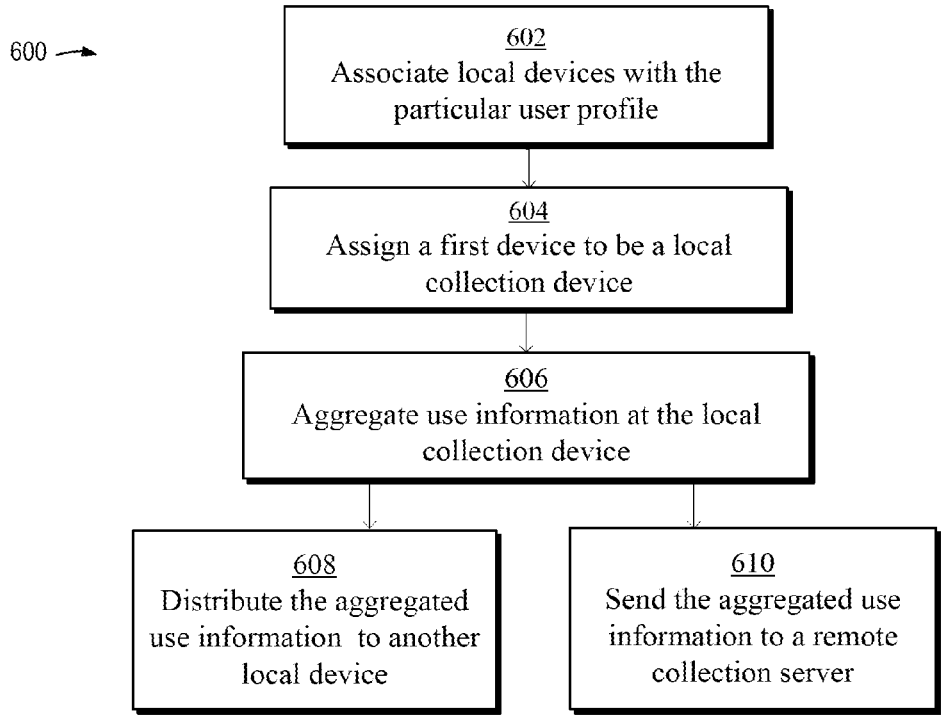
FIG. 6 is a flowchart illustrating an exemplary method for aggregating use information at a local collection device.

FIG. 6 is a flowchart illustrating an exemplary method 600 for aggregating use information at a local collection device. Method 600 is performed in a computing environment in which use information is tracked for devices and is specifically performed by a device, such as computing device 700 of FIG. 7, comprising a processor executing stored instructions. Method 500 involves associating a plurality of local devices with the particular user profile, as shown in block 502. The devices are automatically and/or manually associated with the user profile, for example, using a technique disclosed herein or otherwise.

The method 600 further involves assigning a first device of the plurality of devices to be a local collection device, as shown in block 604. In one embodiment, the assignment is made randomly. In other embodiments, the assignment is based on assignment criteria, such as criteria maximizing device storage, processing capability, communication capabilities, frequency of use, or any other criteria or combination of criteria. The assignment criteria may use thresholds, e.g., requiring minimum storage, and/or may involve comparison, e.g., selecting a local device of the currently available local devices with the maximum storage, etc. The assigning is based on a shared consensus model in one embodiment.

The method 600 further involves, based on assigning the first device to be the local collection device, aggregating use information from other devices associated with the particular user profile at the local collection device, as shown in block 606. Such information is sent directly between the devices, e.g., via Bluetooth, etc., in one embodiment. In another embodiment such use information is provided using a local area network or other local wireless or wired connection of devices.

The method 600 next involves distributing the aggregated use information to another local device, as shown in block 608, and/or sending the aggregated use information to a remote collection server, as shown in block 610.

Exemplary Computing Environment

Figure 7:
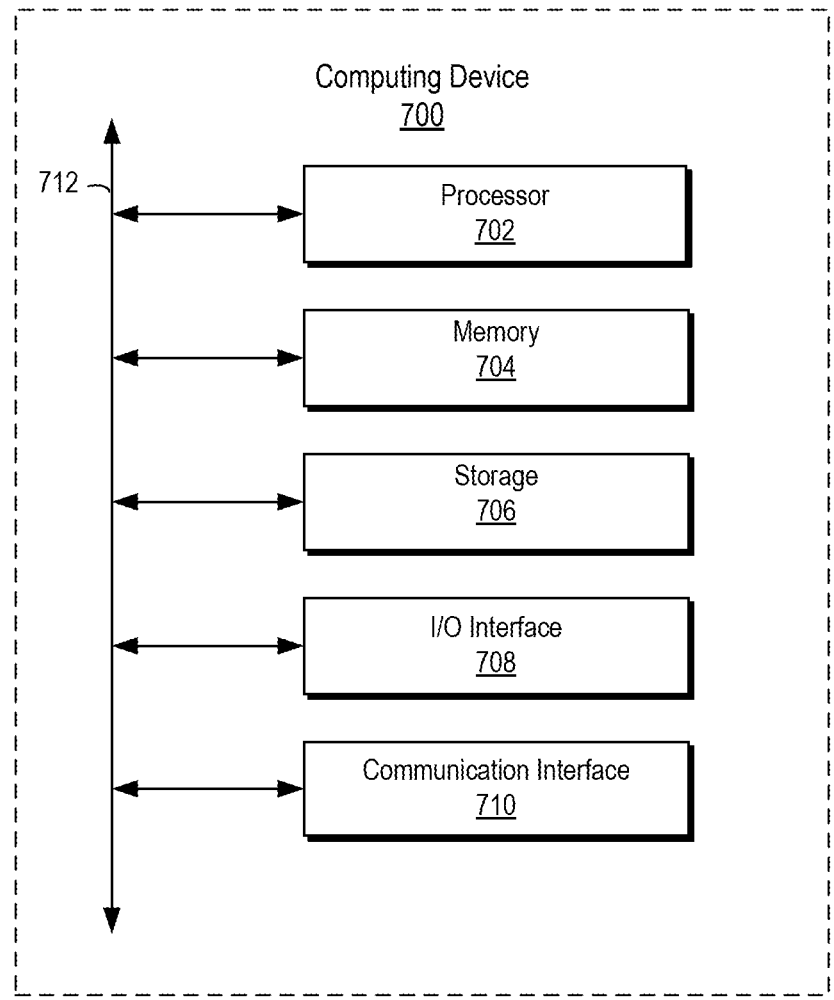
FIG. 7 is a block diagram depicting an example of a computing system used to implement certain embodiments.

Any suitable computing system or group of computing systems can be used to implement the techniques and methods disclosed herein. For example, FIG. 7 is a block diagram depicting examples of implementations of such components. The computing device 700 can include a processor 702 that is communicatively coupled to a memory 704 and that executes computer-executable program code and/or accesses information stored in memory 704 or storage 706. The processor 702 may comprise a microprocessor, an application-specific integrated circuit ("ASIC"), a state machine, or other processing device. The processor 702 can include one processing device or more than one processing device. Such a processor can include or may be in communication with a computer-readable medium storing instructions that, when executed by the processor 702, cause the processor to perform the operations described herein.

The memory 704 and storage 706 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 700 may also comprise a number of external or internal devices such as input or output devices. For example, the computing device is shown with an input/output ("I/O") interface 708 that can receive input from input devices or provide output to output devices. A communication interface 710 may also be included in the computing device 700 and can include any device or group of devices suitable for establishing a wired or wireless data connection to one or more data networks. Non-limiting examples of the communication interface 710 include an Ethernet network adapter, a modem, and/or the like. The computing device 700 can transmit messages as electronic or optical signals via the communication interface 710. A bus 712 can also be included to communicatively couple one or more components of the computing device 700.

The computing device 700 can execute program code that configures the processor 702 to perform one or more of the operations described above. The program code can include one or more modules. The program code may be resident in the memory 704, storage 706, or any suitable computer-readable medium and may be executed by the processor 702 or any other suitable processor. In some embodiments, modules can be resident in the memory 704. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. In a computing environment in which use information is tracked for devices, a method for associating devices with a particular user profile, the method comprising:
receiving information about use of a first device and a second device;
comparing the information about use of the first device and the second device with association criteria, wherein the association criteria requires identifying:

use of the first device and the second device in proximate locations during a time period; or
pairing of the first device to the second device;
based on determining that the information about use of the first device and the second device satisfies the association criteria, associating the first device and the second device with the particular user profile;
assigning the first device to be a local collection device;
configuring the second device to send use information to the first device; and
configuring the first device to aggregate the use information from the second device with use information from the first device.

2. The method of claim 1 wherein a local device determines that the information about the first device and second device satisfies the association criteria.

3. The method of claim 1 wherein comparing the information about use of the first device and second device with the association criteria comprises:
identifying a number of instances in which the first device and second device are both used within proximate locations during the same time periods, the proximate locations comprising a plurality of different geographic locations within a threshold geographic range; and
determining that the association criteria is satisfied based on the number of instances exceeding a predetermined threshold.

4. The method of claim 1 wherein comparing the information about use of the first device and second device with the association criteria comprises:
identifying a frequency that the first device and second device are both used within proximate locations during the same time periods; and
determining that the association criteria is satisfied based on the frequency exceeding a predetermined threshold.

5. The method of claim 1 wherein comparing the information about use of the first device and second device with the association criteria comprises:
identifying a number of instances in which the first device and second device are paired; and
determining that the association criteria is satisfied based on the number of instances exceeding a predetermined threshold.

6. The method of claim 1 wherein comparing the information about use of the first device and second device with the association criteria comprises:
identifying a frequency that the first device and second device are paired; and
determining that association criteria is satisfied based on the frequency exceeding a predetermined threshold.

7. The method of claim 1 further comprising:
preventing the second device from sending the use information about the second device to a remote collection server; and
configuring the first device to aggregate the use information from the second device with use information from the first device and to send the aggregated use information to the remote collection server.

8. The method of claim 1 further comprising, based on the comparing, updating the particular user profile to identify a confidence value that first device or the second device is associated with the particular user profile.

9. The method of claim 1, further comprising determining, based on comparing the information about the use of the first device and the second device with the association criteria, that the first device has interacted with the second device, wherein interactions between the first device and the second device are compared to the association criteria,
wherein associating the first device and the second device with the particular user profile, based on determining that the information about use of the first device and the second device satisfies the association criteria comprises assigning one or more of the first device and the second device to the particular user profile based on determining that the first device has interacted with the second device.

10. In a computing environment in which use information is tracked for devices, a method for distributing or sending use information from devices associated with a particular user profile, the method comprising:
associating a plurality of devices with the particular user profile, wherein the plurality of devices are local to one another;
assigning a first device of the plurality of devices to be a local collection device; and
based on assigning the first device to be the local collection device, aggregating use information from the first device with use information from other devices associated with the particular user profile at the local collection device and performing one or more of (i) distributing the aggregated use information to another local device associated with the particular user profile and (ii) sending the aggregated use information to a remote collection server.

11. The method of claim 10, wherein the assigning is based on processing or memory capabilities of the first device.

12. The method of claim 10, wherein the assigning is based on processing or memory capabilities of the first device relative to other local devices.

13. The method of claim 10, wherein the assigning is based on amount or frequency of use of the first device as compared to amount or frequency of use of the other devices associated with the particular user profile.

14. The method of claim 10, wherein the assigning is based on a shared consensus model, wherein the shared consensus model comprises selecting the first device based on the first device having a more recent interaction with an individual associated with the particular user profile as compared to the other devices associated with the particular user profile.

15. The method of claim 10 further comprising distributing, from the local collection device, the aggregated use information to the another local device associated with the particular user profile.

16. The method of claim 10 further comprising sending, from the local collection device, the aggregated use information to the remote collection server.

17. A system comprising:
a processor;
a memory comprising instructions, wherein when executed by the processor, the instructions perform operations comprising:
receiving information about use of a first device and a second device;
comparing the information about use of the first device and the second device with association criteria, wherein the association criteria requires identifying:
use of the first device and the second device in proximate locations during a time period; or
pairing of the first device to the second device;
based on determining that the information about use of the first device and the second device satisfies the association criteria, associating the first device or the second device with a particular user profile;

assigning the first device to be a local collection device;

configuring the second device to send use information to the first device; and configuring the first device to aggregate the use information from the second device with use information from the first device.

18. The system of claim 17, wherein comparing the information about use of the first device and second device with the association criteria comprises identifying:

a number of instances in which the first device and second device are both used within proximate locations during the same time periods; or a frequency that the first device and second device are both used within proximate locations within proximate time periods.

19. The system of claim 17, wherein comparing the information about use of the first device and second device with the association criteria comprises identifying:

a number of instances in which the first device and second device are paired; or a frequency that the first device and second device are paired.

* * * * *